US00RE50893E

(19) United States
(12) Reissued Patent
Bergman et al.

(10) Patent Number: US RE50,893 E
(45) Date of Reissued Patent: May 19, 2026

(54) TRIPOD CAMERA MOUNT

(71) Applicant: GoPro, Inc., San Mateo, CA (US)

(72) Inventors: Senka Agic Bergman, Montara, CA (US); Nicholas Vitale, Foster City, CA (US); Erik Jorgensen, San Francisco, CA (US)

(73) Assignee: GoPro, Inc., San Mateo, CA (US)

(21) Appl. No.: 29/996,282

(22) Filed: Mar. 31, 2025

Related U.S. Patent Documents

Reissue of:
(64) Patent No.: Des. 852,874
Issued: Jul. 2, 2019
Appl. No.: 29/648,880
Filed: May 24, 2018

U.S. Applications:
(60) Continuation of application No. 29/793,301, filed on Jun. 29, 2023, now abandoned, which is a division of (Continued)

(51) LOC (15) Cl. ..... 16-05
(52) U.S. Cl.
USPC ..... D16/245
(58) Field of Classification Search
USPC ..... D16/219, 237, 244, 245; D14/238, 253; D8/392

(Continued)

(56) References Cited

U.S. PATENT DOCUMENTS 5,341,185 A 8/1994 Nakatani
D395,996 S * 7/1998 Fischer ..... D8/349

(Continued)

FOREIGN PATENT DOCUMENTS

CN 300710506 11/2007
CN 301939756 S 5/2012

(Continued)

OTHER PUBLICATIONS

GoPro Volta Tripod, https://www.amazon.com/GoPro-Volta-Official-Accessory/dp/B09XY38VG2?th=1, Apr. 14, 2022 (Year: 2022) 11 pages.

(Continued)

*Primary Examiner* — Philip S Hyder
(74) *Attorney, Agent, or Firm* — Young Basile Hanlon & MacFarlane, P.C.

(57) CLAIM

The ornamental design for a tripod camera mount, as shown and described.

DESCRIPTION

FIG. 1 is a front, top, and right perspective view of a tripod camera mount *in a first configuration*;
FIG. 2 is a rear, bottom, and left perspective view thereof;
FIG. 3 is a front view thereof;
FIG. 4 is a rear view thereof;
FIG. 5 is a left view thereof;
FIG. 6 is a right view thereof;
FIG. 7 is a top view thereof; and,
FIG. 8 is a bottom view thereof.
*FIG. 9 is a top, front, and right perspective view of the tripod camera mount in a second configuration;*
*FIG. 10 is a rear, bottom, and left perspective view thereof;*
*FIG. 11 is a front view thereof;*
*FIG. 12 is a rear view thereof;*
*FIG. 13 is a left view thereof;*
*FIG. 14 is a right view thereof;*
*FIG. 15 is a top view thereof; and,*
*FIG. 16 is a bottom view thereof.*
The ornamental design which is claimed is shown in solid lines in the drawings. The broken lines in the drawings form no part of the claimed design. Broken lines formed by equal length dashes (i.e., dash-dash) show unclaimed subject (Continued)

[AMENDED]

matter. Broken lines form by unequal length dashes (i.e., dash-dot) define bounds of the claimed design.

1 Claim, 16 Drawing Sheets

Matter enclosed in heavy brackets [ ] appears in the original patent but forms no part of this reissue; matter printed in italics indicates the additions made by reissue.

Related U.S. Application Data application No. 29/827,581, filed on Feb. 21, 2022, now Pat. No. Re. 50,616, which is a continuation of application No. 29/797,572, filed on Jul. 1, 2021, now Pat. No. Re. 49,005, which is an application for the reissue of Pat. No. Des. 852,874, which is a continuation of application No. 29/596,331, filed on Mar. 7, 2017, now Pat. No. Des. 822,092.

(58) Field of Classification Search
CPC ..... F16M 11/046; F16M 11/24; F16M 2200/024; F16M 2200/028
See application file for complete search history.

(56) References Cited

U.S. PATENT DOCUMENTS

| | | | | | |
|---|---|---|---|---|---|
| D415,805 | S | | 10/1999 | Wygonik | |
| D463,877 | S | * | 10/2002 | Kung | D26/38 |
| D505,442 | S | | 5/2005 | Watters | |
| D508,938 | S | | 8/2005 | Watters | |
| D532,436 | S | | 11/2006 | Kruse | |
| D533,578 | S | | 12/2006 | Oka | |
| D552,660 | S | | 10/2007 | Lee | |
| D620,491 | S | * | 7/2010 | Wu | D14/411 |
| D632,720 | S | | 2/2011 | Barker | |
| D670,752 | S | | 11/2012 | Barber | |
| D705,468 | S | | 5/2014 | Tompkin | |
| D714,775 | S | | 10/2014 | Ahn | |
| D718,365 | S | | 11/2014 | Hayashi | |
| D730,429 | S | * | 5/2015 | Anari | D16/237 |
| D739,456 | S | | 9/2015 | Poli | |
| D749,164 | S | * | 2/2016 | Raccah | D16/242 |
| 9,298,066 | B1 | * | 3/2016 | Fan | G03B 17/561 |
| D757,842 | S | * | 5/2016 | Harrison | D16/242 |
| D759,147 | S | * | 6/2016 | Harrison | D16/245 |
| 9,360,742 | B1 | * | 6/2016 | Harrison | H04N 23/51 |
| D766,230 | S | | 9/2016 | Shepard | |
| D772,027 | S | | 11/2016 | Man | |
| D779,579 | S | * | 2/2017 | Anari, III | D16/242 |
| 9,588,407 | B1 | * | 3/2017 | Harrison | F16M 11/18 |
| D795,326 | S | * | 8/2017 | Martin | D16/242 |
| D800,206 | S | | 10/2017 | Ham | |
| 9,810,974 | B2 | * | 11/2017 | Chi | G03B 17/561 |
| D821,483 | S | * | 6/2018 | Vitale | D16/244 |
| D822,092 | S | * | 7/2018 | Bergman | D16/243 |
| 10,047,901 | B2 | | 8/2018 | Hida | |
| D831,098 | S | * | 10/2018 | Truesdale | D16/242 |
| D833,511 | S | * | 11/2018 | Paterson | D16/242 |
| D852,874 | S | | 7/2019 | Bergman et al. | |
| D857,085 | S | | 8/2019 | Yamaguchi | |
| D860,298 | S | | 9/2019 | Balmer | |
| D882,672 | S | | 4/2020 | Xia | |
| D928,220 | S | | 8/2021 | Liang | |
| D955,466 | S | | 6/2022 | Wada et al. | |
| D969,203 | S | | 11/2022 | Shen | |
| D973,128 | S | | 12/2022 | Wang | |
| D976,305 | S | | 1/2023 | Xu | |
| D982,065 | S | | 3/2023 | Muhlenkamp, IV et al. | |
| D985,040 | S | | 5/2023 | Peng et al. | |
| D991,327 | S | | 7/2023 | Wang | |
| D996,507 | S | | 8/2023 | Zhang | |
| D1,005,377 | S | | 11/2023 | Wang et al. | |
| D1,009,017 | S | | 12/2023 | Cheny et al. | |
| D1,034,767 | S | | 7/2024 | Muhlenkamp, IV et al. | |
| D1,034,768 | S | | 7/2024 | Hao | |
| 2005/0092878 | A1 | | 5/2005 | Murray et al. | |
| 2016/0131963 | A1 | * | 5/2016 | Clearman | G03B 17/561 224/267 |
| 2016/0212869 | A1 | * | 7/2016 | Gutschenritter | A42B 3/0406 |
| 2017/0009802 | A1 | * | 1/2017 | Uke | G03B 17/563 |
| 2017/0108760 | A1 | * | 4/2017 | Achenbach | F16M 11/10 |
| 2017/0370518 | A1 | | 12/2017 | Hida | |
| 2019/0128469 | A1 | | 5/2019 | Lu | |
| 2022/0357640 | A1 | | 11/2022 | Chen et al. | |

FOREIGN PATENT DOCUMENTS

| | | | |
|---|---|---|---|
| CN | 302895830 | S | 7/2014 |
| CN | 203927319 | U | 11/2014 |
| CN | 303151643 | S | 4/2015 |
| CN | 303169679 | S | 4/2015 |
| CN | 303368492 | S | 9/2015 |
| CN | 303454033 | S | 11/2015 |
| CN | 303565158 | S | 1/2016 |
| CN | 303719623 | S | 6/2016 |
| CN | 303739365 | S | 7/2016 |
| CN | 303877711 | S | 10/2016 |
| CN | 303988497 | S | 12/2016 |
| CN | 303988499 | S | 12/2016 |
| KR | 20150001235 | | 10/2015 |

OTHER PUBLICATIONS

Volta Camera Battery grip, https://gopro.com/en/us/shop/mounts-accessories/volta/APHGM-001-master.html, retrieved Jan. 25, 2024 (Year: 2024).

Smatree Go Pro Accessories—Smapole Q3 Telescoping Go Pro Pole. [online] Retrieved Jan. 19, 2018 from URL:https:// www.alibaba.com/product-detail/Smatree-Go-pro-Accessories-SmaPole-Q3 60258252130.html (14 pages).

Luxebell Selfie Stick Telescoping with Tripod Stand Mount for Gopro Hero4 3+3. [online] Published on Nov. 8, 2016. Retrieved Jan. 19, 2018 from URL:http://www.luxebell.net/home/27-luxebell-selfie-stick-telescoping-with-tripod-stand-mount-for-gopro-hero4-3-3-hero-lcd-session-cell-phones.html (3 pages).

* cited by examiner

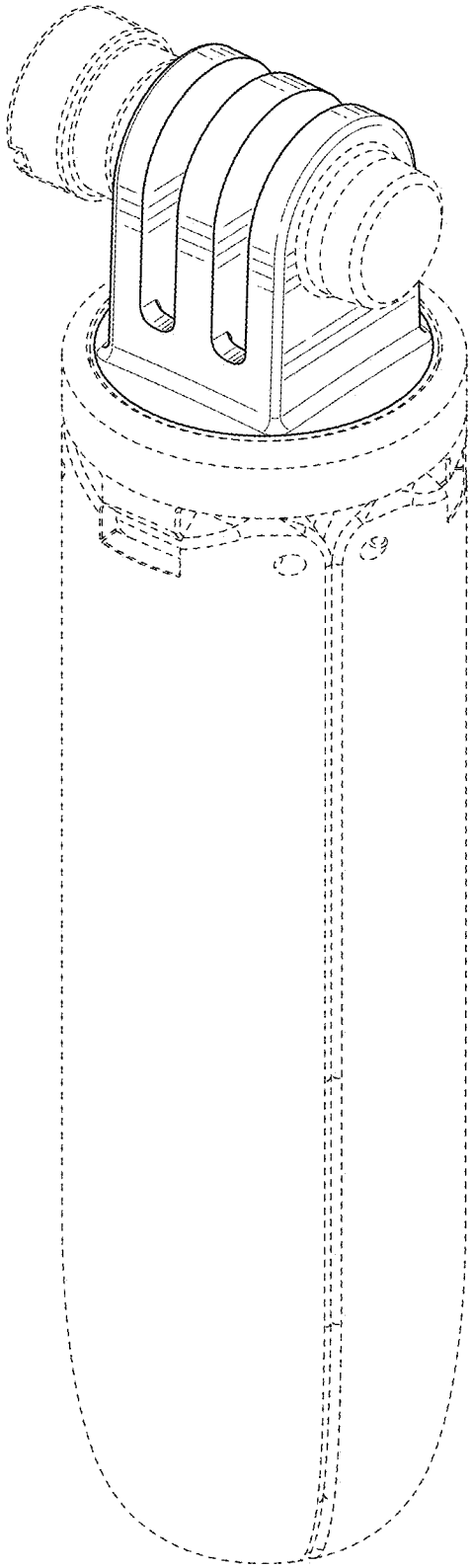
FIG. 1 [AMENDED]

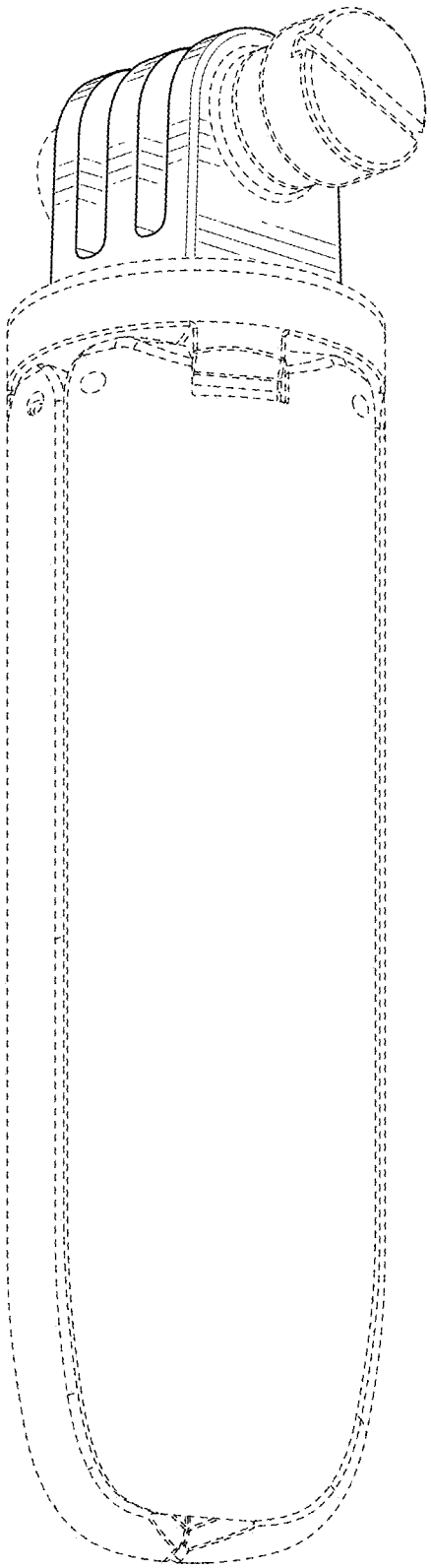
FIG. 2 [AMENDED]

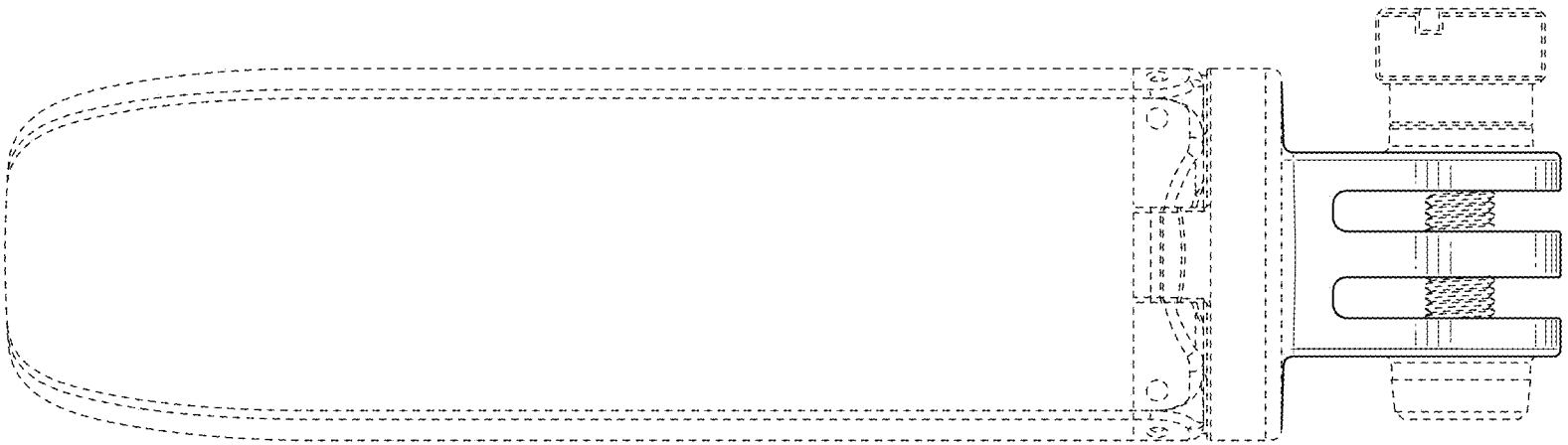
FIG. 3 [AMENDED]

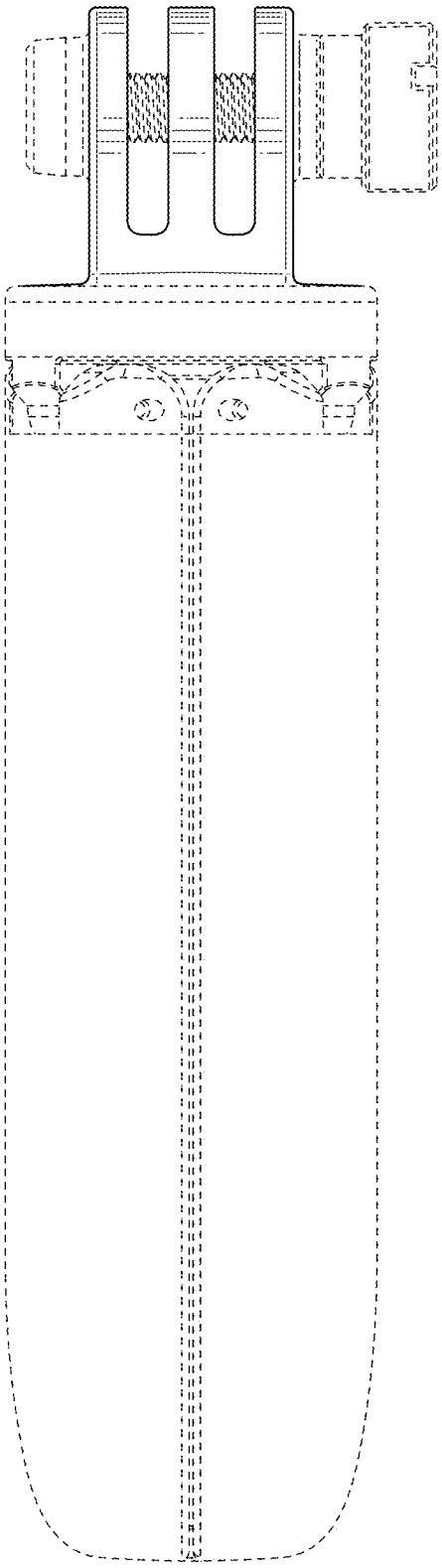
FIG. 4 [AMENDED]

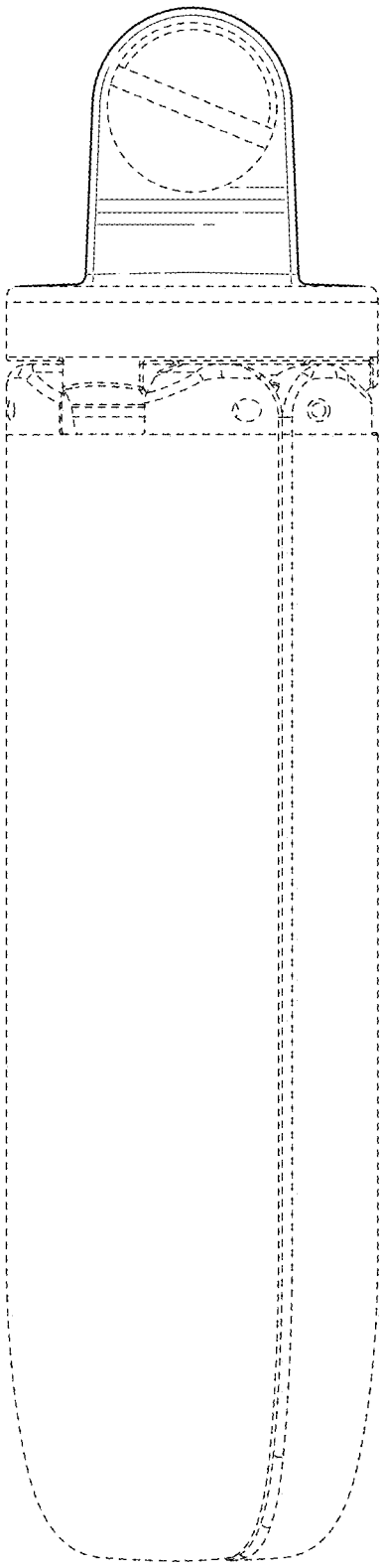
FIG. 5 [AMENDED]

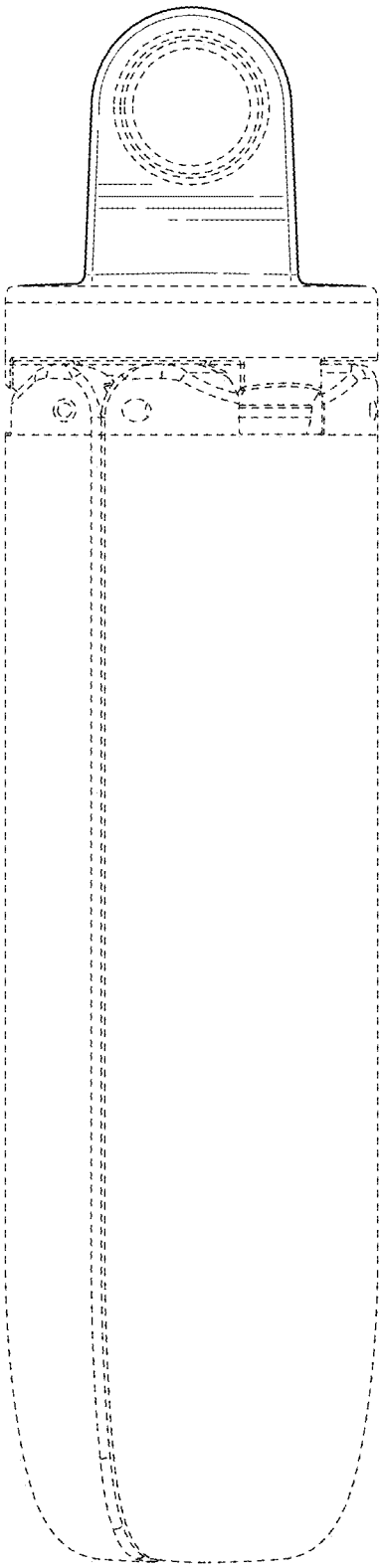
FIG. 6 [AMENDED]

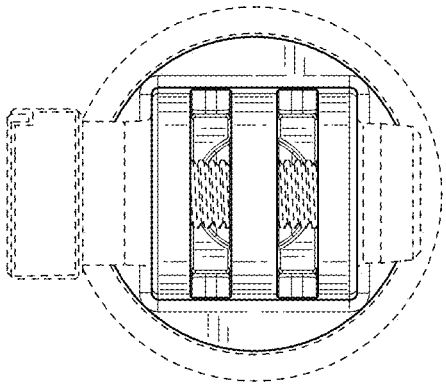
FIG. 7 [AMENDED]

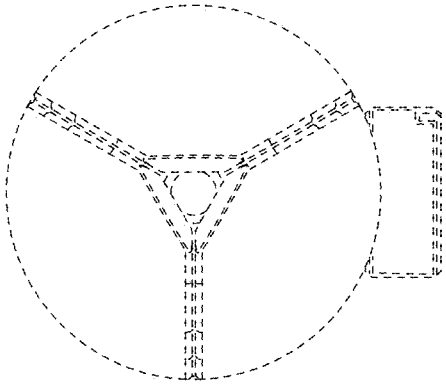
FIG. 8 [AMENDED]

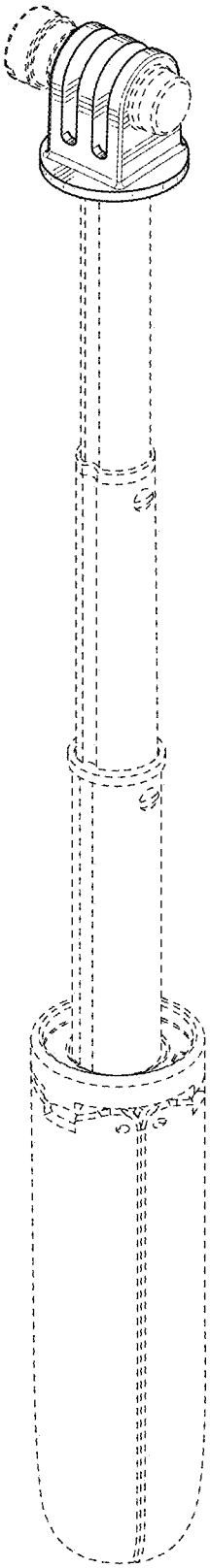
FIG. 9 [NEW]

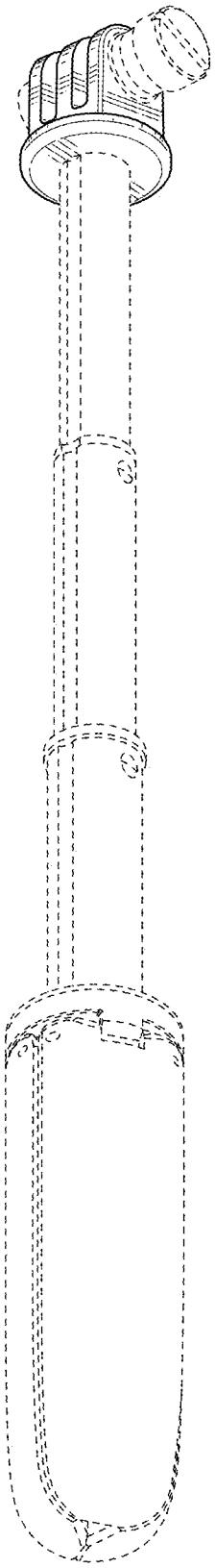
FIG. 10 [NEW]

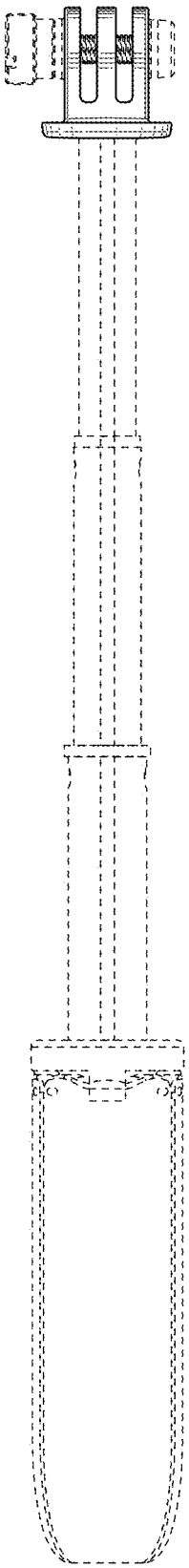
FIG. 11 [NEW]

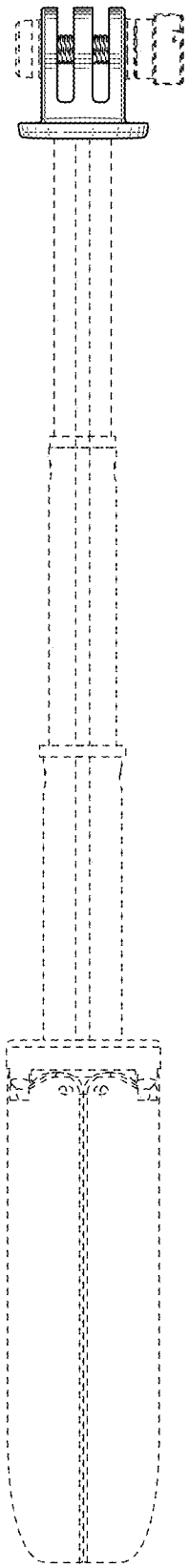
FIG. 12 [NEW]

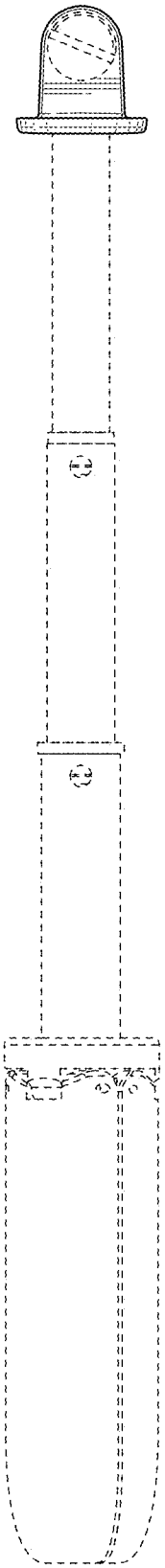
FIG. 13 [NEW]

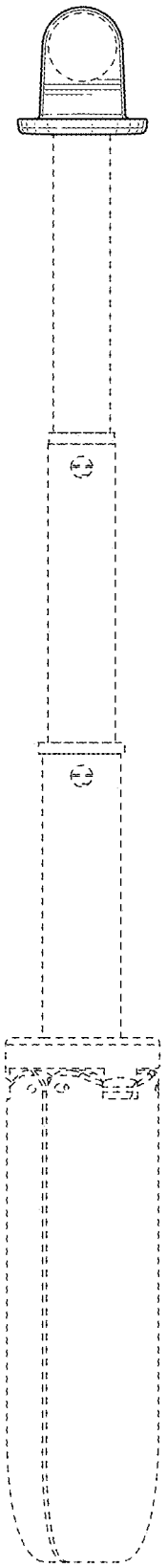
FIG. 14 [NEW]

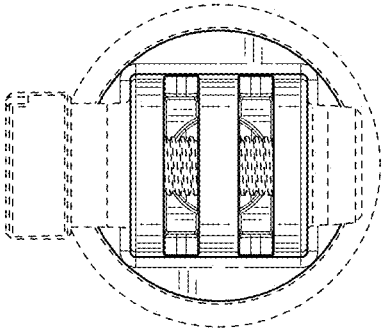
FIG. 15 [NEW]

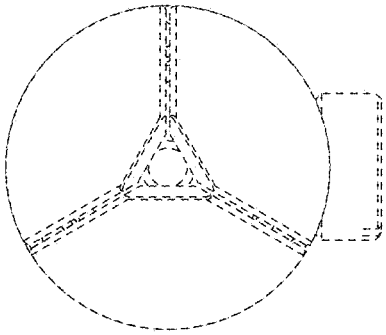
FIG. 16 [NEW]